United States Patent
Byers et al.

(10) Patent No.: US 8,872,878 B2
(45) Date of Patent: Oct. 28, 2014

(54) ADAPTATION OF VIDEO FOR USE WITH DIFFERENT NUMBER OF CAMERAS AND DISPLAYS AT ENDPOINTS

(75) Inventors: Charles Byers, Wheaton, IL (US); Jim Chou, San Jose, CA (US); Rohit Puri, Campbell, CA (US)

(73) Assignee: Cisco Technology, Inc., San Jose, CA (US)

( * ) Notice: Subject to any disclaimer, the term of this patent is extended or adjusted under 35 U.S.C. 154(b) by 638 days.

(21) Appl. No.: 13/136,003

(22) Filed: Jul. 20, 2011

(65) Prior Publication Data

US 2013/0021428 A1    Jan. 24, 2013

(51) Int. Cl.
*H04N 7/14* (2006.01)
*H04N 7/15* (2006.01)
*G06F 3/14* (2006.01)

(52) U.S. Cl.
CPC ............... *G06F 3/1446* (2013.01); *H04N 7/15* (2013.01); *H04N 7/147* (2013.01)
USPC ................... 348/14.07; 348/14.08; 348/14.1; 348/14.12

(58) Field of Classification Search
CPC ........ G06F 3/1446; H04N 7/14; H04N 7/141; H04N 7/142; H04N 7/144; H04N 7/147; H04N 7/148; H04N 7/15; H04N 7/152; H04N 7/155; H04N 7/157
USPC .......... 348/14.01, 14.02, 14.03, 14.04, 14.05, 348/14.06, 14.07, 14.08, 14.09, 14.1, 14.11, 348/14.12, 14.13, 14.14, 15.15, 14.16
See application file for complete search history.

(56) References Cited

U.S. PATENT DOCUMENTS

| | | | | |
|---|---|---|---|---|
| 6,075,571 A  * |  6/2000 | Kuthyar et al. | ............... | 348/584 |
| 7,328,439 B1 * |  2/2008 | Clark et al. | ................... | 719/318 |
| 7,693,190 B2 * |  4/2010 | Firestone et al. | ............. | 370/503 |
| 2001/0026318 A1* | 10/2001 | Yonezawa et al. | ........... | 348/159 |
| 2002/0021296 A1* |  2/2002 | Tsuji et al. | ...................... | 345/418 |
| 2002/0167531 A1* | 11/2002 | Baudisch | ....................... | 345/611 |
| 2003/0184647 A1* | 10/2003 | Yonezawa et al. | ............ | 348/143 |
| 2005/0083331 A1 |  4/2005 | MacKinlay | | |
| 2006/0005136 A1* |  1/2006 | Wallick et al. | ................ | 715/726 |
| 2010/0123770 A1* |  5/2010 | Friel et al. | .................. | 348/14.08 |
| 2011/0222676 A1* |  9/2011 | Okada et al. | ............... | 379/93.21 |

FOREIGN PATENT DOCUMENTS

WO     WO 2010/072075         7/2010

OTHER PUBLICATIONS

F.De la Torre etal.,"Omnidirectional Video Capturing,Multiple People Tracking and Identification for Meeting Monitoring",Robotics Institute,Caregie Mellon University, Jan. 2005.

J. Foote and et., "FlyCam: Practical Panoramic Video and Automatic Camera Control", ICME,vol. 3, pp. 1419-1422, 2000.

(Continued)

*Primary Examiner* — Khai N Nguyen
(74) *Attorney, Agent, or Firm* — Cindy Kaplan (57) ABSTRACT

In one embodiment, a method includes identifying priority objects in a composite image created from one or more input video streams, processing the composite image, and generating a plurality of output video streams. The output video streams correspond to display screens available for viewing the output video streams and the number of output video streams is different than the number of input video streams. Processing the composite image includes positioning the priority objects to prevent placement of the priority objects at a location extending over two of the display screens. An apparatus is also disclosed.

20 Claims, 6 Drawing Sheets

(56) References Cited

OTHER PUBLICATIONS

R. Cutler at al., "Distributed meetings: A Meeting Capture and Broadcasting System," ACM Multimedia, 2002.

Y. Rui et al., "Viewing Meetings Captured by an Omni-directional Camera", ACM CHI, pp. 450-457, Seattle, Mar. 31-Apr. 4, 2001.

X. Sun et al., "Panoramic Video Capturing and Compressed Domain Virtual Camera Control", ACM Multimedia, pp. 229-238, 2001.

* cited by examiner

ADAPTATION OF VIDEO FOR USE WITH DIFFERENT NUMBER OF CAMERAS AND DISPLAYS AT ENDPOINTS

TECHNICAL FIELD

The present disclosure relates generally to communication networks, and more particularly, to video conferencing.

BACKGROUND

Video conferencing provides real-time, face-to-face interactions between people from distributed geographic locations and has become increasingly popular as a way to reduce travel expenses and enhance collaboration. High end teleconference (sometimes referred to as Telepresence) rooms may include any number of display screens for displaying video received from other endpoints in the teleconference. For teleconference systems in which the endpoints include the same number of cameras and display screens, the interconnection is straight forward. However, when the number of screens and cameras is different on two endpoints, conventional systems may leave screens blank, show only a portion of available video, or display video in a format that is difficult for participants to view. What is needed is a way to preserve the illusion of being in the same room even if the number of cameras and screen differ on two endpoints of a conference.

BRIEF DESCRIPTION OF THE FIGURES

Corresponding reference characters indicate corresponding parts throughout the several views of the drawings.

DESCRIPTION OF EXAMPLE EMBODIMENTS

Overview

In one embodiment, a method generally comprises identifying priority objects in a composite image created from one or more input video streams, processing the composite image, and generating a plurality of output video streams. The output video streams correspond to display screens available for viewing the output video streams, and the number of output video streams is different than the number of input video streams. Processing the composite image comprises positioning the priority objects to prevent placement of the priority objects at a location extending over two of the display screens.

In another embodiment, an apparatus generally comprises a processor for identifying priority objects in a composite image created from one or more input video streams, processing the composite image, and generating a plurality of output video streams. The output video streams correspond to display screens available for viewing the output video streams, and the number of output video streams is different than the number of input video streams. Processing the composite image comprises positioning the priority objects to prevent placement of the priority objects at a location extending over two of the display screens. The apparatus further comprises memory for storing the number of display screens at one or more endpoints.

Example Embodiments

The following description is presented to enable one of ordinary skill in the art to make and use the embodiments. Descriptions of specific embodiments and applications are provided only as examples, and various modifications will be readily apparent to those skilled in the art. The general principles described herein may be applied to other applications without departing from the scope of the embodiments. Thus, the embodiments are not to be limited to those shown, but are to be accorded the widest scope consistent with the principles and features described herein. For purpose of clarity, details relating to technical material that is known in the technical fields related to the embodiments have not been described in detail.

When endpoints in a teleconference system are configured with different number of cameras and display screens, there is not a one-to-one mapping between video from cameras at one endpoint and display screens receiving video at the other endpoint. For example, one endpoint may have five cameras and display screens while another endpoint has only three cameras and display screens. If one camera is mapped to one screen, the endpoint with five screens will have two blank screens since the other endpoint does not have a sufficient number of cameras to feed all of the display screens. The endpoint with only three screens will not be able to show all five video streams originating from the five cameras at the other endpoint. The video displayed on the three screens may switch between different video streams so that participants that are currently speaking or have recently spoken are displayed, for example. Algorithms may be used to attempt to scale the incoming video streams and split or merge them so that all of the input video streams are displayed on the available screens. However, with this technique, there is a good chance that a participant's face or other priority object will be split between two adjacent screens, which would be highly undesirable.

The embodiments described herein provide for adaptation of video for use with a different number of cameras and displays at endpoints. As described below, all video streams from cameras at one endpoint in a conference are displayed on all display screens at a remote endpoint, regardless of the number of cameras or displays, without introducing undesirable effects such as face splitting across two display screens. The embodiments provide an optimal viewing experience at a multi-screen conference endpoint.

The term 'conference' as used herein refers to a meeting, video conference, telepresence session, teleconference, broadcast, telecast, or any other communication session between a plurality of users transmitted using any video means. The video may be encrypted, compressed, or encoded according to any format.

Figure 1:
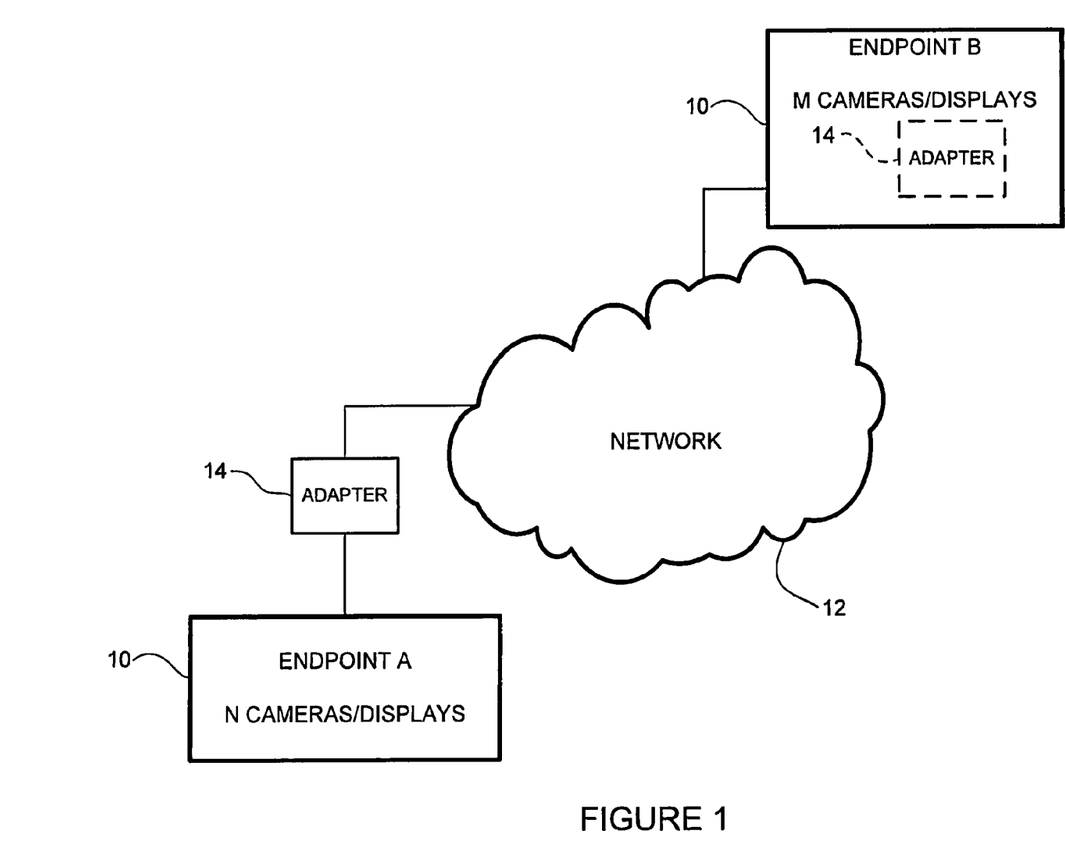
FIG. 1 illustrates an example of a network in which embodiments described herein may be implemented.

Referring now to the figures, and first to FIG. 1, an example of a network in which embodiments described herein may be implemented is shown. The network includes a communication system comprising endpoints A, B (e.g., media sources/receivers) 10 in communication over network 12. The network 12 may include one or more networks (e.g., local area network, metropolitan area network, wide area network, enterprise network, Internet, intranet, radio access network, public switched network, or any other network). The endpoints 10 are connected via communication links. Media flow paths between the endpoints 10 may include any number or type of intermediate nodes (e.g., routers, switches, gateways, or other network devices), which facilitate passage of data between the endpoints.

The endpoints 10 are configured to originate or terminate communications over the network 12. The endpoints 10 may be any device or combination of devices configured for receiving, transmitting, or receiving and transmitting media flows. For example, the endpoint 10 may be a telepresence device, media center device, or any other device capable of engaging in video exchanges within the network 12.

For simplification, only two endpoints 10 are shown in FIG. 1, however, the communication system may include any number of endpoints 10. One or more of the endpoints 10 may have a different number of cameras and display screens than another endpoint. For example, endpoint A may have N=five cameras and display screens and endpoint B may have M=three cameras and display screens. The number of cameras at one endpoint 10 is typically equal to the number of display screens at the same endpoint, although an endpoint may have a different number of cameras and display screens.

The communication system further includes an adapter 14 configured to process video transmitted between endpoints 10 having a different number of cameras and display screens. The embodiments described herein may be implemented at an adapter node 14 (e.g., central adapter node) located within the communication path between endpoints 10, at an adapter module 14 located at one or more endpoints, or any combination thereof. For example, the adapter node 14 may be configured to receive N video streams from endpoint A and process the video to output M video streams for transmittal to endpoint B (where N is not equal to M). The adapter node 14 may be, for example, a media experience engine, multimedia transformation unit, multipoint conferencing unit, server, or any other node configured to receive, process, and transmit video. If the adapter node 14 is interposed in a communication path between endpoints 10, traffic may be selectively directed to the adapter node. For example, video transmitted between two endpoints 10 having the same number of cameras and display screens may bypass the adapter node 14 to avoid unnecessary processing.

In another embodiment, N video streams transmitted from endpoint A are received at endpoint B and processed at the adapter module 14 (shown in phantom at endpoint B) to generate M video output streams. The adapter module 14 may also process M video streams generated at endpoint B for display at N display screens at endpoint A. The adapter module 14 may be located, for example, at a camera subsystem, display subsystem, or any other system located at the endpoint 10.

Components of the adapter 14 may also be located at one or more of the adapter node and module so that one or more processes can be performed at one endpoint 10 (or adapter node) and one or more processes performed at another endpoint (or adapter node). For example, adapter module 14 located at endpoint B may create a composite image (described below) from the M individual video streams received from cameras at the originating endpoint and then transmit the composite image to another adapter (e.g., adapter node or adapter module at endpoint A), which is configured to create from the composite image, N output video streams corresponding to the number of display screens at endpoint A. Adapter modules at other endpoints or the adapter node may also process the composite image to create a different number of output video streams corresponding to the number of display screens at other endpoints.

It is to be understood that the network shown in FIG. 1 and described herein is only an example and that the embodiments may be implemented in networks having different network topologies or network devices, without departing from the scope of the embodiments.

Figure 2:
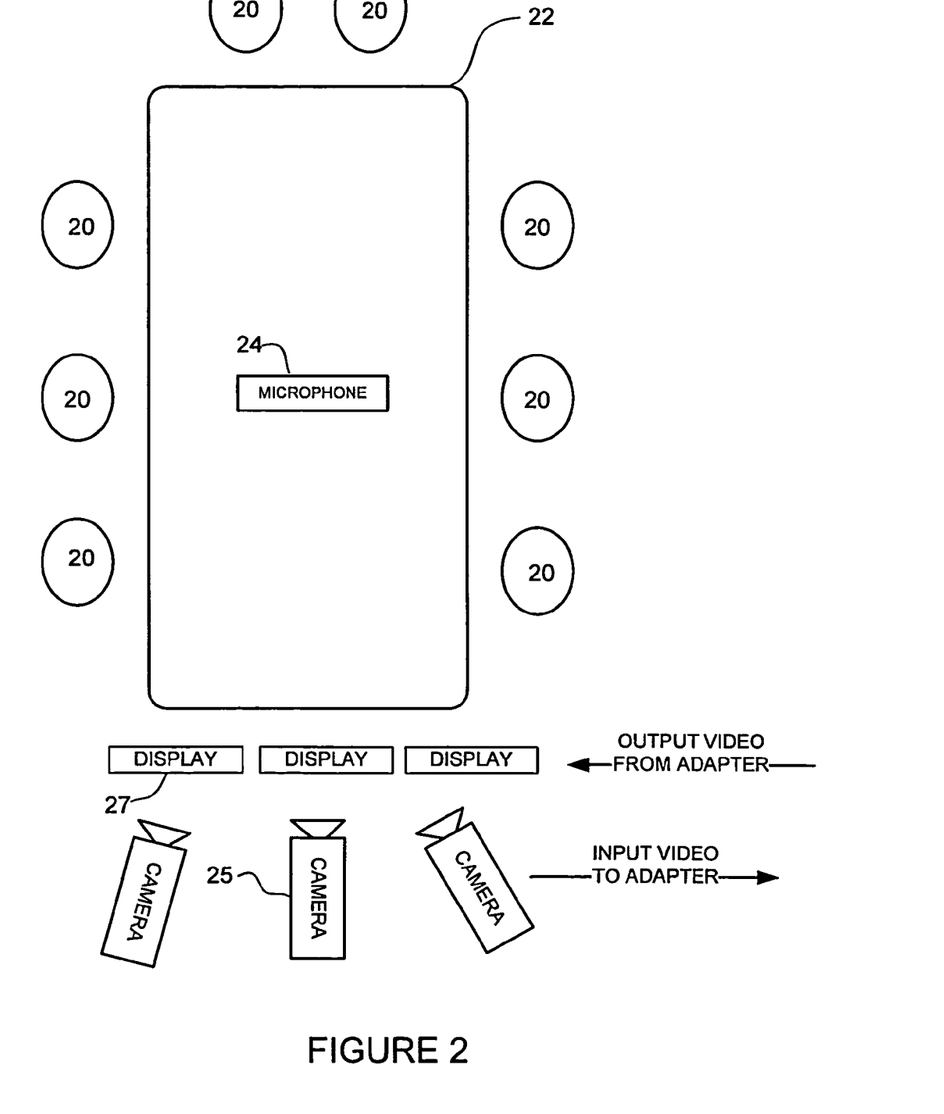
FIG. 2 is a top view of an example of a conference room operating as one of the endpoints in the network of FIG. 1.

FIG. 2 is a schematic top view of an example of a conference room arrangement for use in a teleconference. Participants 20 may be seated around a table 22 or may be standing or walking around the room. The room may include one or more microphones 24 positioned on the table 22. One or more cameras 25 are located in the conference room and preferably positioned to view most of the room. The room also includes display screens 27 located at one end of the conference room. The display screens 27 may be located, for example, below the cameras 25. The example shown in FIG. 2 includes three cameras 25 and three display screens 27. Each endpoint 10 may include any number of cameras 25 and display screens 27.

As described in detail below, video from the cameras 25 is input to the adapter 14, which processes the video for display at remote endpoints. The adapter 14 also processes video received from remote endpoints and outputs video to the display screens 27. As described above with respect to FIG. 1, the video processing may be performed at a central adapter node, adapter module located at one or more endpoints, or any combination thereof. It is to be understood that the arrangement shown in FIG. 2 is only an example and other arrangements may be used without departing from the scope of the embodiments. For example, the endpoint 10 may include any number of cameras 25 or display screens 27 (e.g., 1, 2, 3, 4, 5, or more).

Figure 3:
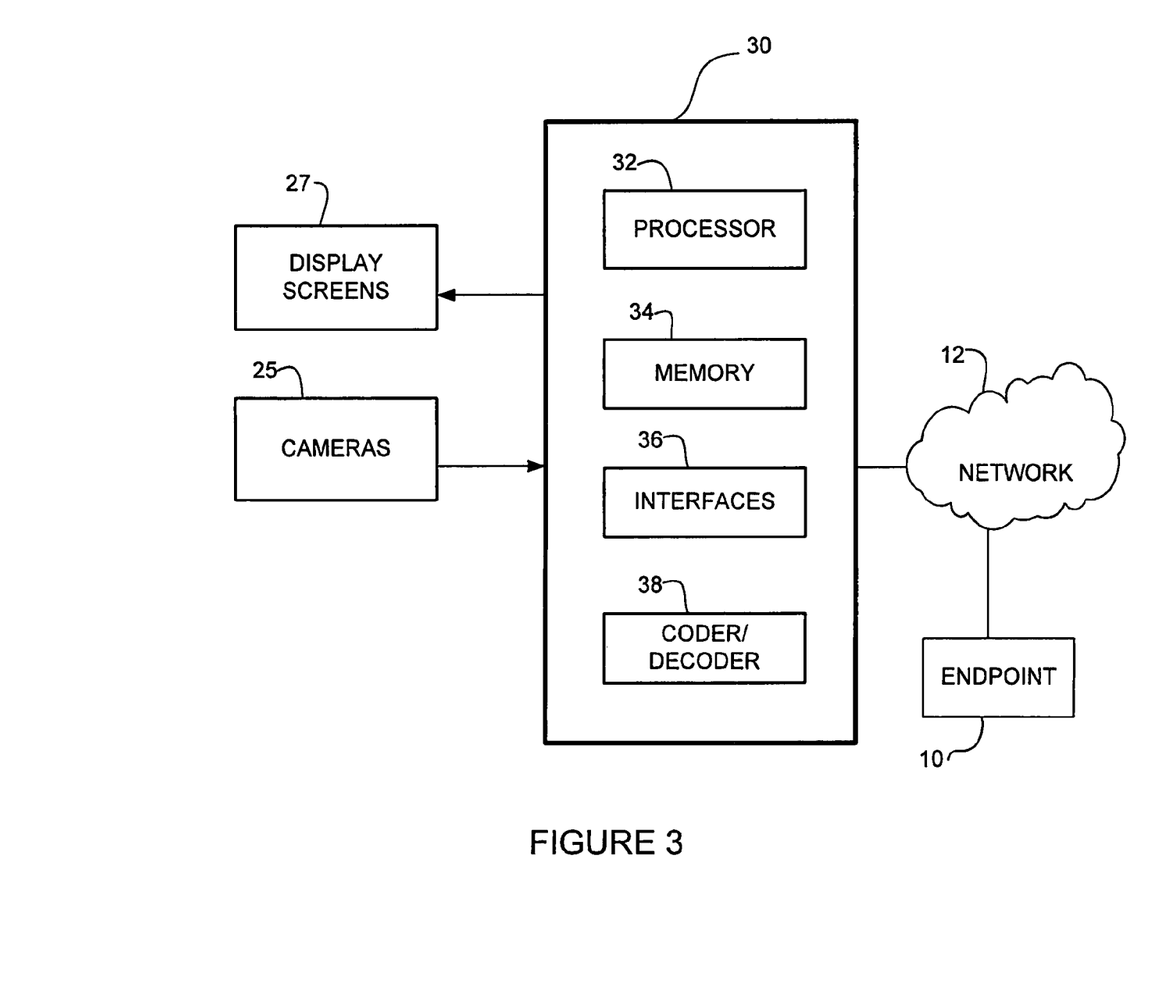
FIG. 3 depicts an example of a network device useful in implementing embodiments described herein.

FIG. 3 is a block diagram illustrating an example of a network device (e.g., adapter node, teleconference device) 30 that may be used to implement embodiments described herein. The network device 30 is in communication with one or more endpoints 10 over network 12, as described above with respect to FIG. 1. The network device 30 receives input from video cameras 25 and outputs video to display screens 27 located at endpoints 10. The network device 30 is a programmable machine that may be implemented in hardware, software, or any combination thereof. The network device 30 includes a processor 32, memory 34, interfaces 36, and coder/decoder subsystem 38.

Memory 34 may be a volatile memory or non-volatile storage, which stores various applications, modules, and data for execution and use by the processor 32. Frame buffer memory may store, for example, the number of display screens 27 at one or more endpoints 10 for use in creating the output video streams.

Logic may be encoded in one or more tangible computer readable media for execution by the processor 32. For example, the processor 32 may execute codes stored in a computer-readable medium such as memory 34. The computer-readable medium may be, for example, electronic (e.g., RAM (random access memory), ROM (read-only memory), EPROM (erasable programmable read-only memory)), magnetic, optical (e.g., CD, DVD), electromagnetic, semiconductor technology, or any other suitable medium.

The interfaces 36 may comprise any number of interfaces (linecards, ports) for receiving signals or data or transmitting signals or data to other devices. The interfaces 36 may include, for example, an Ethernet interface for connection to a computer or network.

The coder/decoder subsystem 38 may include, for example, an audio codec and video codec configured to accept audio and video signals and compress the audio and video for transmission to the adapter node 14 or other endpoints 10 of the teleconference.

The network device 30 may further include any suitable combination of hardware, software, algorithms, processors, DSPs (digital signal processors), devices, components, or elements operable to facilitate the capabilities described herein. The network device 30 may include additional subsystems of a teleconference system located at the endpoint 10 or may be a standalone device within a communication path between endpoints. It is to be understood that the network device 30 shown in FIG. 3 and described above is only one example and that different components and configurations may be used, without departing from the scope of the embodiments.

Figure 4A:
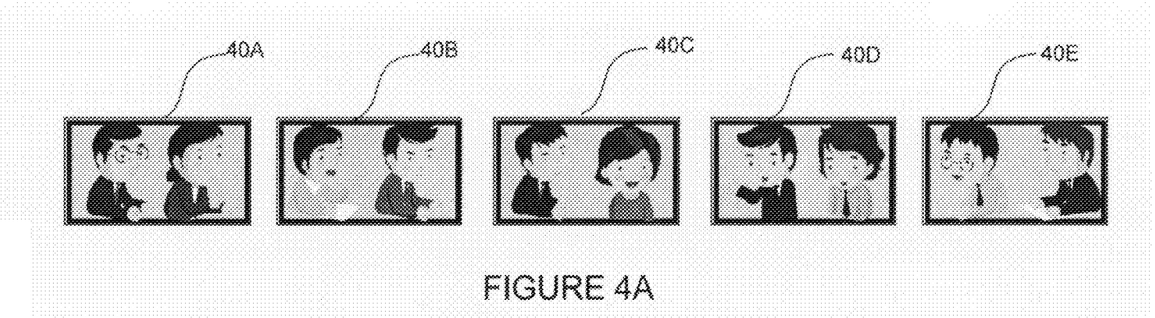
FIG. 4A illustrates an example of video input from an endpoint with five cameras.
Figure 4B:
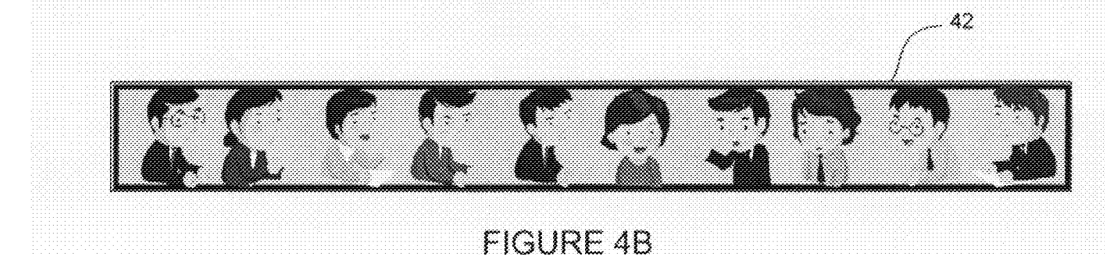
FIG. 4B illustrates an example of a composite image created from the video input shown in FIG. 4A.
Figure 4C:
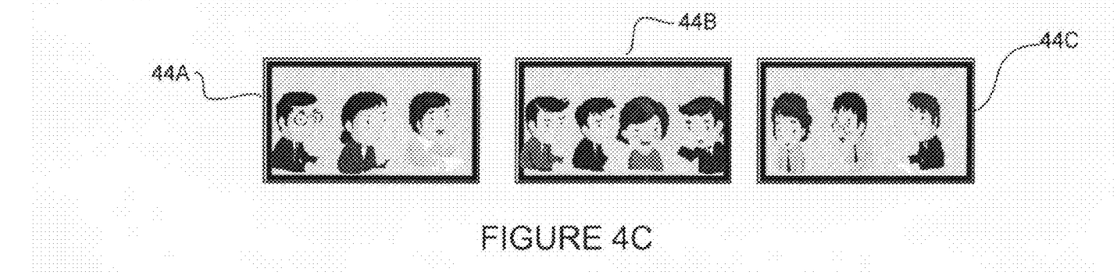
FIG. 4C illustrates an example of video output generated from the composite image of FIG. 4B for an endpoint with three display screens.

FIGS. 4A-4C illustrate an example of adaptation of video generated at an endpoint with five cameras for display at an endpoint with three display screens. FIG. 4A shows five video inputs 40A, 40B, 40C, 40D, 40E received from five cameras at a first endpoint (e.g., endpoint A in FIG. 1). FIG. 4B illustrates a composite image 42 of all five screens shown in 4A, with stitched left to right edges in one frame buffer. The video streams may be arranged in a left to right sequence in a composite frame buffer in a geometry related to the arrangement of the cameras at the originating endpoint. For example, if there are five cameras, each producing a 1920×1080 pixel image, the composite image would have a size of 9600×1090 pixels. As described in detail below, after the composite image 42 (FIG. 4B) is generated, priority objects are identified, and geometric transformations (e.g., translating, scaling, deleting) are performed to move or scale the priority objects in the composite image and prevent these objects from falling on a boundary between two output images (FIG. 4C). FIG. 4C illustrates the composite image 42 of FIG. 4B segmented into three outputs (viewports) 44A, 44B, 44C for display on the three display screens at a second endpoint (e.g., endpoint B in FIG. 1). As shown in FIG. 4C, faces of conference participants (priority objects) appear in only one output video. The viewports 44A, 44B, 44C are created such that all people (or other important objects captured by the cameras) are shown on the display screens with no important objects split across a boundary between two or more display screens. Since all of the faces are displayed on the available display screens, there is no need for screen switching or active speaker detection.

The priority objects shown in FIGS. 4A-4C include conference participants. Other priority objects may include, for example, prototypes, models, products, components, pictures, non-digital whiteboard, etc. Selection of priority objects may be based on user preferences. For example, a user at one endpoint may specify that only faces are priority objects. Once a priority object is identified, a region around the object may be defined as a region not to be split across video boundaries (e.g., hotspot).

Figure 5:
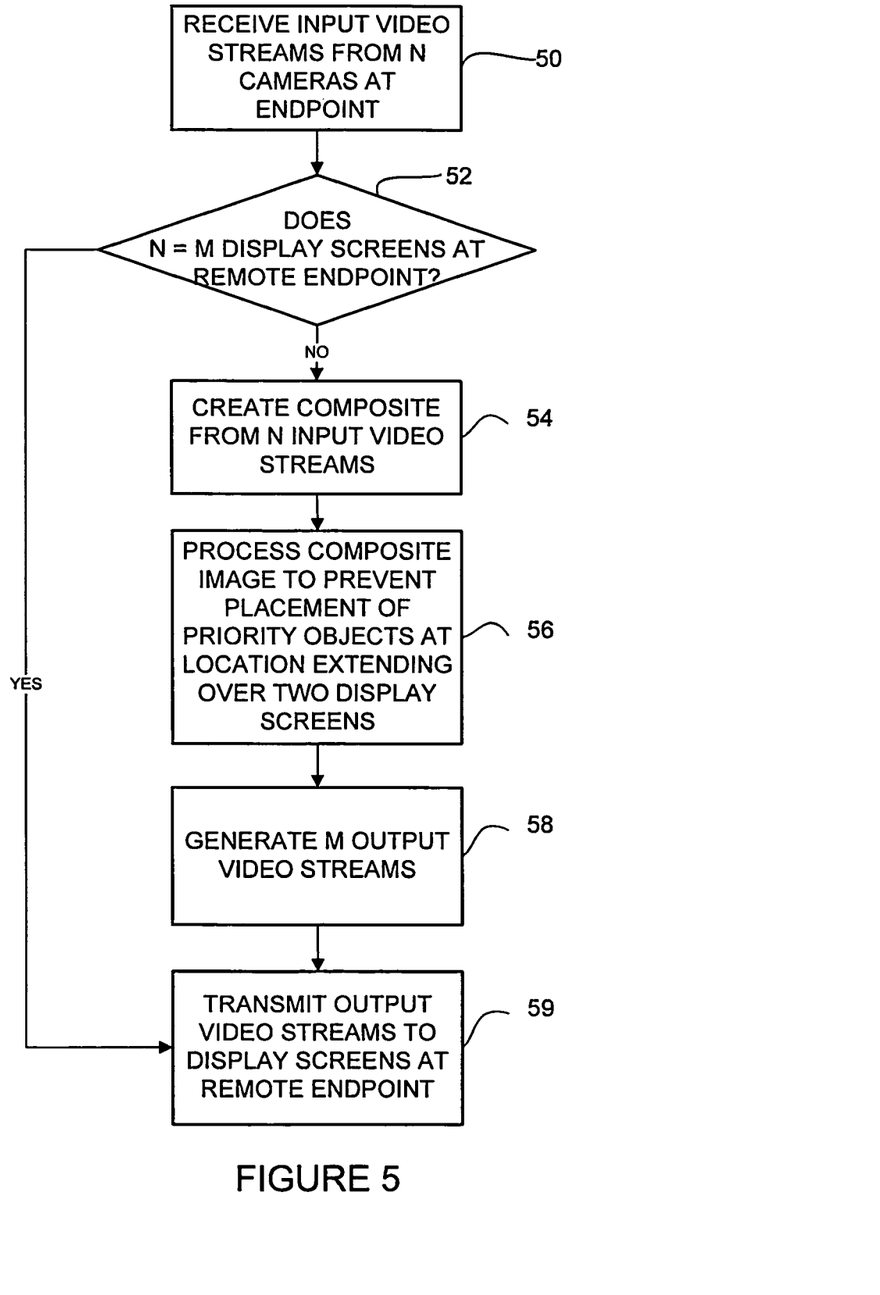
FIG. 5 is a flowchart illustrating an overview of a process for adaptation of video for use with different number of cameras and displays, in accordance with one embodiment.

FIG. 5 is a flowchart illustrating an overview of a process for adaptation of video for use at endpoints with different number of cameras and display screens, in accordance with one embodiment. At step 50, the adapter 14 receives N video streams from N cameras at endpoint A (FIGS. 1 and 5). If the adapter 14 is located remote from the endpoint, the video streams are compressed and transmitted to the adapter node, where the video streams are uncompressed. If the number of cameras and displays are the same at the originating endpoint and the remote endpoint, the video can be transmitted to the endpoint with a one-to-one mapping between input video streams and output video streams (step 52). If the number of display screens at one or more of the remote endpoints differs from the number of cameras at the originating endpoint, the video is processed to adapt to the number of display screens at the remote endpoint. A composite image 42 (FIG. 4B) is created from the input video streams 40A-40E (FIG. 4A) (step 54). The adapter 14 may use, for example, a scene-stitching algorithm to create the composite image.

The composite image is processed to prevent placement of priority objects at a location extending over two or more display screens (step 56) (described below with respect to FIG. 6). At step 58, M video output streams corresponding to the number of display screens available for viewing the output video at the remote endpoint are generated from the composite image. The output video streams are then transmitted to the remote endpoint or directly to the display screens if the processing is performed at the remote endpoint (step 59). The video output may be compressed for transmittal over the network.

As previously discussed, the process shown in FIG. 5 may be performed at more than one node. For example, the composite image may be created at an endpoint and transmitted to the adapter node or adapter module at one or more other endpoints. In this case, the adapter would only perform steps 56-59.

Figure 6:
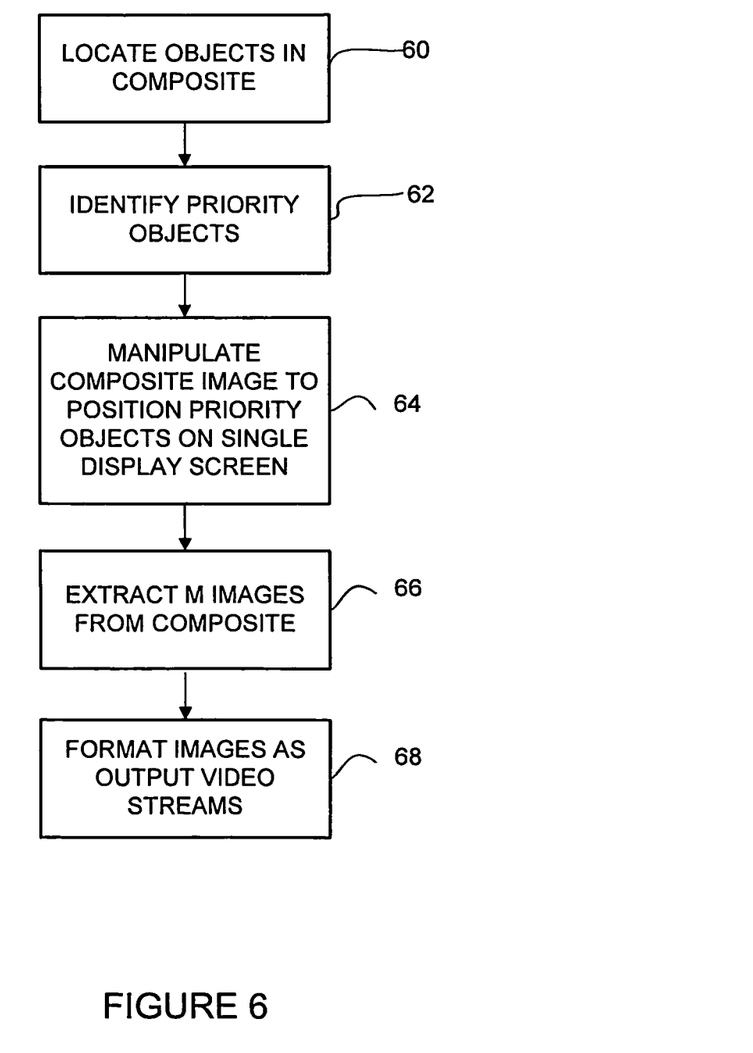
FIG. 6 is a flowchart illustrating details for generating the video output from the composite image, in accordance with one embodiment.

FIG. 6 illustrates details for processing the composite frame buffer to generate the output video streams (steps 56 and 58 of FIG. 5), in accordance with one embodiment. At step 60, objects in the composite image are identified along with locations of the objects. Any number of the objects in the composite image may be identified as priority objects (step 62). The term 'priority object' as used herein refers to an object that is identified as sufficiently important that it should not be split between two display screens. Objects may be tagged, for example, as a background image, ancillary object (e.g., item on tabletop), or people (faces). In one embodiment, the tags are assigned a priority related to how critical it is that the object is displayed and not distorted or split across display screens. Objects such as faces or display items (models, prototypes, etc.) may be identified as priority objects. User preferences may be input for use in assigning a priority to objects. The priority may be based on a comparative level (e.g., high, medium, low) in which case the priority objects may include only high priority objects, or both high and medium priority objects, for example. The objects may also be identified as either priority objects (i.e., objects that are not split across screens) or non-priority objects (objects that may be split across screens or removed from video output).

After the priority objects have been identified, the composite frame buffer is manipulated to position priority objects in locations within the composite frame image where they will be located entirely on a single display screen (step 64) (FIG. 6). The selected number of viewport images are extracted from the composite frame buffer (step 66) and formatted as video streams (step 68). The video streams may be compressed if they are to be transmitted over the network 12. The endpoint 10 receiving the video streams uncompresses the video and displays the videos on the display screens.

It is to be understood that the processes shown in FIGS. 5 and 6 and described above are only examples and that steps may be removed, added, reordered, or combined, without departing from the scope of the embodiments.

Locations of the priority objects within the composite image may be identified using image processing and object (e.g., face) recognition algorithms, for example (step 60 in FIG. 6). Background subtraction may be used to isolate foreground objects. Face detection may include reporting the position of a person as an x, y coordinate, for example. Many face detection methods are known by those skilled in the art and may be used. For example, face detection may include eye detection or fitting elliptical shapes to edges detected corresponding to a face, though other face detection algorithms known by those skilled in the art are contemplated to be within the scope of the embodiments. It is to be understood that these are only examples and that other methods may be used to identify objects in the composite image, as are well known by those skilled in the art.

Various processing algorithms may be used to manipulate the composite frame buffer to move priority objects laterally to locations in the composite image where they will be located entirely on a single display screen when the viewports are extracted (steps 64 and 66 in FIG. 6).

In one embodiment, the different camera views are stitched together, removing the redundant areas between views. Pixels located along a vertical direction are selectively removed, effectively squeezing the priority objects closer together. The pixels that are removed are the ones that are determined to be of the lowest priority (non-priority objects) and are removed to ensure that a priority object is not located on two display screens. Pixels may also be removed and interpolated to accommodate heterogeneous aspect ratios between cameras and displays. In situations where the system is adapting from a smaller number of cameras to a larger number of screens, pixels may be added to the image in a way that does not interfere with priority objects. These new pixels can be colored and textured to match the background in nearby areas to make this addition less noticeable.

In another embodiment, geometric transformations are used to translate or scale the priority objects in the composite image so that the priority objects do not fall on a boundary between two video output images, which would result in an object being split across two display screens. The input video streams are combined by translating objects to the left or right to make sure that priority objects are located on a selected display screen. Scaling operations may also be used to reduce the size of a collection of objects so that they fit on a single display screen.

After the manipulations are complete, there remains a cluster of objects in the frame buffer that fall inside the viewports. Frame buffer locations outside the viewports do not include priority objects and are not captured for display.

In one embodiment, an optimization function utilizing weights is used to locate and optimally transform the priority objects in the composite image so that when viewports are extracted, no important objects span multiple display screens. The optimization function quantifies the cost of moving an object in terms of a distortion measurement for use in selecting a viewport in which to place each of the priority objects. The efficiency of the algorithm in terms of manipulating priority objects so that they do not fall off screen boundaries is measured by a cost function (referred to herein as a distortion measure). The total distortion measure equals the sum of the distortions for each of the priority objects, with the objective being to minimize the overall distortion.

In one embodiment, a dynamic program is used to optimize the distortion measure. A trellis (rectangular grid) associated with the dynamic program is defined as the number of states (y-axis), which is equal to the number of displays, and a number of stages (x-axis), which is equal to the number of priority objects. The definition of a stage is that stage p corresponds to the first p objects. The total number of priority objects is P. For any stage p, the total distortion cost is equal to the distortion cost for the first p objects+distortion cost for the last (P−p) objects. The distortion measure is additive, therefore, for every viewport policy that is chosen for the last (P−p) objects, the total distortion cost is optimized when the optimal viewport policy is chosen for the first p objects. At any stage p, only one viewport policy per state needs to be remembered (as opposed to $2^p$). This framework enables fast and efficient computation of the optimal placement policy for priority objects.

Although the method and apparatus have been described in accordance with the embodiments shown, one of ordinary skill in the art will readily recognize that there could be variations made without departing from the scope of the embodiments. Accordingly, it is intended that all matter contained in the above description and shown in the accompanying drawings shall be interpreted as illustrative and not in a limiting sense.

What is claimed is:

1. A method comprising:
creating a composite image from two or more input video streams at a network device;
identifying at the network device, priority objects in said composite image;
processing said composite image at the network device; and
generating a plurality of output video streams at the network device, said output video streams corresponding to display screens available for viewing said output video streams;
wherein the number of input video streams is different than the number of output video streams and processing said composite image comprises positioning said priority objects to prevent placement of said priority objects at a location extending over two of the display screens.

2. The method of claim 1 wherein positioning said priority objects comprises translating said priority objects.

3. The method of claim 1 wherein positioning said priority objects comprises scaling said priority objects.

4. The method of claim 1 wherein positioning said priority objects comprises adding or removing pixels from said composite image.

5. The method of claim 1 wherein positioning said priority objects comprises optimizing locations of said priority objects.

6. The method of claim 5 wherein optimizing comprises calculating a distortion measure for each of said priority objects and minimizing an overall distortion value.

7. The method of claim 1 wherein the number of input video streams corresponds to a number of cameras in a teleconference room.

8. The method of claim 1 wherein the number of input video streams is less than the number of output video streams.

9. The method of claim 1 wherein the number of input video streams is greater than the number of output video streams.

10. An apparatus comprising:
a processor for creating a composite image from two or more input video streams, identifying priority objects in said composite image, processing said composite image, and generating a plurality of output video streams, said output video streams corresponding to display screens available for viewing said output video streams; and memory for storing a number of the display screens at one or more endpoints;

wherein the number of input video streams is different than the number of output video streams and processing said composite image comprises positioning said priority objects to prevent placement of said priority objects at a location extending over two of the display screens.

11. The apparatus of claim 10 wherein positioning said priority objects comprises translating said priority objects.

12. The apparatus of claim 10 wherein positioning said priority objects comprises scaling said priority objects.

13. The apparatus of claim 10 wherein positioning said priority objects comprises adding or removing pixels from said composite image.

14. The apparatus of claim 10 wherein positioning said priority objects comprises optimizing locations of said priority objects.

15. The apparatus of claim 14 wherein optimizing comprises calculating a distortion measure for each of said priority objects and minimizing an overall distortion value.

16. Logic encoded on one or more non-transitory computer readable media for execution and when executed operable to:

create a composite image from two or more input video streams;

identify priority objects in said composite image;

process said composite image; and generate a plurality of output video streams, said output video streams corresponding to display screens available for viewing said output video streams;

wherein the number of input video streams is different than the number of output video streams and processing said composite image comprises positioning said priority objects to prevent placement of said priority objects at a location extending over two of the display screens.

17. The logic of claim 16 wherein positioning said priority objects comprises optimizing locations of said priority objects.

18. The logic of claim 16 further comprising logic operable to transmit said plurality of output video streams to a remote endpoint comprising the display screens.

19. The logic of claim 16 wherein the number of input video streams corresponds to a number of cameras in a teleconference room.

20. The logic of claim 16 further comprising logic operable to generate said composite image from said plurality of input video streams.

* * * * *